J. LUX.
HORSE HAY-FORKS.
No. 193,977.  Patented Aug. 7, 1877.
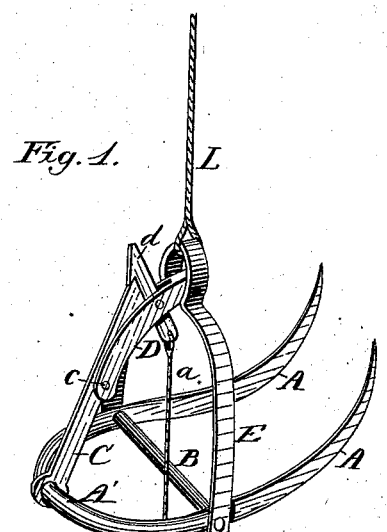
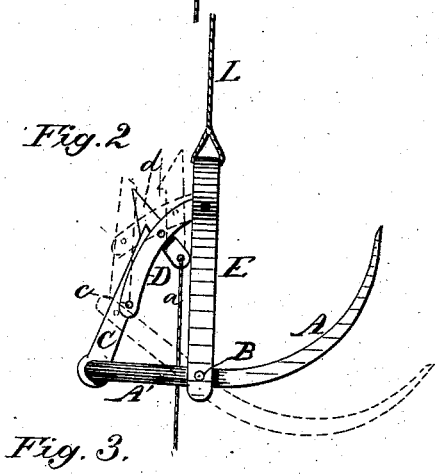
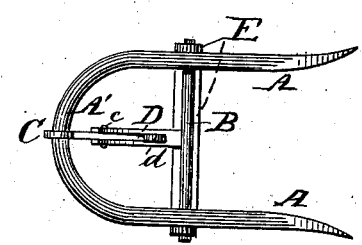
Attest:
Jno. P. Brooks.
August Petersohn.
Inventor:
John Lux,
by Louis Bagger & Co.
Attys.

UNITED STATES PATENT OFFICE.

JOHN LUX, OF HOPKINTON, IOWA.

IMPROVEMENT IN HORSE HAY-FORKS.

Specification forming part of Letters Patent No. 193,977, dated August 7, 1877; application filed May 26, 1877.

*To all whom it may concern:*

Be it known that I, JOHN LUX, of Hopkinton, in the county of Delaware and State of Iowa, have invented certain new and useful Improvements in Horse Hay-Forks; and I do hereby declare that the following is a full, clear, and exact description thereof, which will enable others skilled in the art to which it appertains to make and use the same, reference being had to the accompanying drawings, which form a part of this specification, and in which—

Figure 1 is a perspective view. Fig. 2 is a side elevation, and Fig. 3 is a bottom plan.

Similar letters of reference indicate corresponding parts in all the figures.

My invention consists in an improved construction of horse hay-forks, whereby I am enabled to readily insert and withdraw the prongs of the fork into or from its load of hay, besides firmly holding the load while this is being elevated and carried on the fork, so as to avoid dropping, substantially as hereinafter more fully described, and pointed out in the claim.

In the drawing, A A are the prongs, made of steel preferably, and united by means of a curved piece of round iron, A', to which they are welded. B is a cross-bar, which unites the prongs A A, projecting slightly on each side of the fork, so as to form pivots for the hinged and swinging bail E, to the top of which the hoisting-rope L is secured. C is a lever-arm, hinged upon the curved back piece A' of the fork, and pivoted at $c$ to an elbow, D, the other end of which is pivoted in the eye or upper part of bail E. $d$ is a catch or dog, pivoted in the elbow D, to the lower end of which is hung the trip-line $a$.

From the foregoing description, taken in connection with the drawing, the manner of using my improved horse hay-fork will be readily understood. To insert the fork into the hay, the operator catches lever C with one hand, so as to release it from dog $d$, which throws the bail E back, so as to give prongs A A a downward direction, and these are then forced into the hay by pressing with the foot on cross-bar B. When the load of hay is on the fork, bail E is tilted forward again by forcing lever C in under the dog $d$, which catches hold of it and retains it and bail E in their position while the load is being carried upon the fork.

To release the fork from the hay, dog $d$ is jerked off of lever C by a sharp pull on the trip-line $a$, when it may be readily withdrawn.

The position of the fork for inserting it into, or withdrawing it from, the load of hay is represented in dotted lines in Fig. 2.

Having thus described my invention, I claim and desire to secure by Letters Patent of the United States—

The horse hay-fork herein shown and described, consisting of the fork A A' A, having cross-bar B, swinging bail E, hinged lever C, elbow D, and pivoted dog $d$, constructed, combined, and operating substantially as and for the purpose hereinbefore set forth.

In testimony that I claim the foregoing as my own I have hereto affixed my signature in presence of two witnesses.

JOHN LUX.

Witnesses:
RICHARD COOK,
GEORGE LUX.